US010185795B1

(12) United States Patent
Keller et al.

(10) Patent No.: US 10,185,795 B1
(45) Date of Patent: *Jan. 22, 2019

(54) SYSTEMS AND METHODS FOR STATISTICAL STATIC TIMING ANALYSIS

(71) Applicant: Cadence Design Systems, Inc., San Jose, CA (US)

(72) Inventors: Igor Keller, Pleasanton, CA (US); Praveen Ghanta, Cupertino, CA (US); Arun Kumar Mishra, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/290,356

(22) Filed: Oct. 11, 2016

(51) Int. Cl.
*G06F 17/50* (2006.01)

(52) U.S. Cl.
CPC .................. *G06F 17/5031* (2013.01)

(58) Field of Classification Search
CPC ............. G06F 17/5031; G06F 17/5036; G06F 17/5045; G06F 18/5081; G06F 2217/84; G01R 31/31725
USPC .................................................. 716/108, 113
See application file for complete search history.

(56) References Cited

U.S. PATENT DOCUMENTS

| | | | |
|---|---|---|---|
| 8,497,640 B2 | 7/2013 | Feldtkeller | |
| 8,555,222 B2 | 10/2013 | Le et al. | |
| 8,843,873 B1 | 9/2014 | Sharma et al. | |
| 2004/0002844 A1* | 1/2004 | Jess | G06F 17/5036 703/14 |
| 2004/0103379 A1 | 5/2004 | Alpert et al. | |
| 2005/0267377 A1 | 12/2005 | Marossero et al. | |
| 2007/0266357 A1* | 11/2007 | Kimata | G06F 17/5031 716/113 |
| 2009/0031268 A1 | 1/2009 | Miranda et al. | |
| 2009/0306953 A1 | 12/2009 | Liu et al. | |
| 2010/0287517 A1 | 11/2010 | Buss et al. | |
| 2010/0305886 A1 | 12/2010 | Zhuge | |
| 2016/0041016 A1 | 2/2016 | Gossweiler et al. | |
| 2016/0282124 A1 | 9/2016 | Chowdhury et al. | |
| 2016/0364517 A1 | 12/2016 | Pelloie et al. | |
| 2017/0262569 A1 | 9/2017 | Huynh et al. | |

OTHER PUBLICATIONS

"U.S. Appl. No. 15/290,362, Non Final Office Action dated Nov. 3, 2017", 15 pgs.
U.S. Appl. No. 15/290,362, Ex Parte Quayle Action mailed Mar. 1, 2018.
U.S. Appl. No. 15/290,362, Response filed Feb. 5, 2018 to Non Final Office Action dated Nov. 3, 2017, 10 pgs.

* cited by examiner

*Primary Examiner* — Paul Dinh
(74) *Attorney, Agent, or Firm* — Schwegman Lundberg & Woessner, P.A.

(57) ABSTRACT

Electronic design automation systems, methods, and media are presented for characterizing on-chip variation of circuit elements in a circuit design using statistical values including skew, and for performing statistical static timing analysis using these statistical values. One embodiment models delay characteristics under certain operating conditions for circuit elements with asymmetric (e.g., non-Gaussian) probability density functions using normalized skewness. The modeled delay can then be used to perform various timing analysis operations.

20 Claims, 13 Drawing Sheets

| LOAD 702 | | | | | |
|---|---|---|---|---|---|
| | 721 | 722 | 723 | 724 | 725 |
| | 726 | 727 | 728 | 729 | 730 |
| SLEW 704 | 731 | 732 | 733 | 734 | 735 |
| | 736 | 737 | 738 | 739 | 740 |
| | 741 | 742 | 743 | 744 | 745 |

*FIG. 7*

SYSTEMS AND METHODS FOR STATISTICAL STATIC TIMING ANALYSIS

TECHNICAL FIELD

Embodiments described herein relate to electronic design automation (EDA), and to systems, methods, devices, and instructions for generating library constructs and performing timing analysis operations as part of generation of circuit designs.

BACKGROUND

Electronic design automation (EDA) is a category of systems for assisting with the design of electronic systems and devices. Large, integrated circuit designs are often assembled from previously designed blocks. This enables reduced turnaround times for generation of an integrated circuit. Schematic and layout information for such block portions of a design may be exchanged or licensed as intellectual property. Timing analysis is an EDA verification analysis whereby the timing of circuit elements and/or circuit blocks is analyzed to verify that the design meets constraints in order to operate at intended clock rates in an expected operating environment.

BRIEF DESCRIPTION OF THE DRAWINGS

Various ones of the appended drawings merely illustrate example embodiments of the present disclosure and should not be considered as limiting its scope.

FIG. 7 illustrates aspects of statistical static timing analysis in accordance with some embodiments.

DETAILED DESCRIPTION

Figure 1:
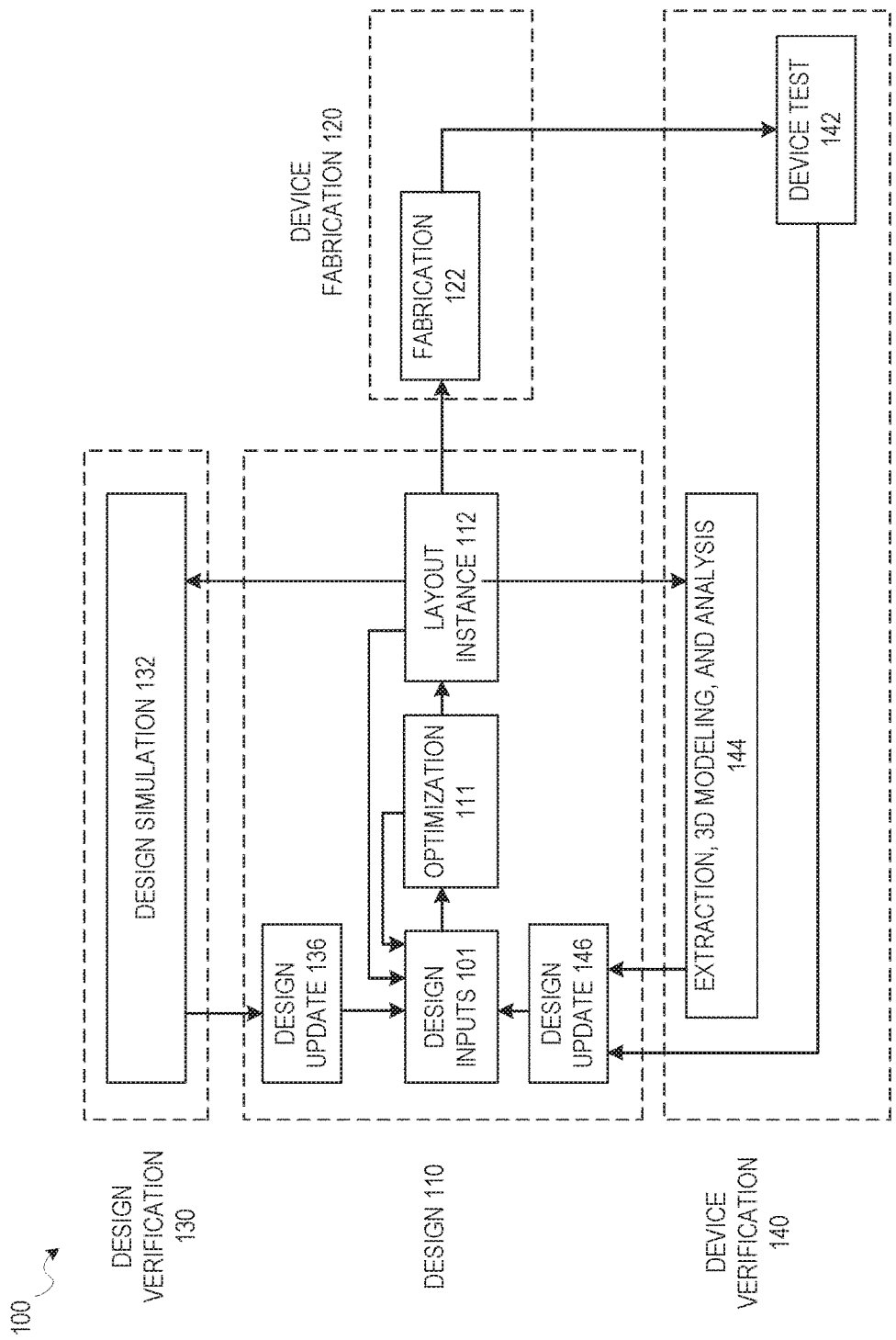
FIG. 1 is a diagram illustrating one possible design process flow for generating a circuit with timing closure performed using statistical static timing analysis according to some embodiments.

Embodiments described herein relate to electronic design automation (EDA) and to methods, computer media, and devices used for analyzing, optimizing, and creating electronic circuits. Some embodiments include generating library constructs and performing timing analysis operations with circuit elements or blocks using skew values as part of an optimized model for on-chip variation. Various embodiments include descriptions of generating library files for use with timing analysis as part of generation and optimization of circuit designs and the associated circuit devices. While certain example embodiments are discussed, it will be apparent that other embodiments not specifically described herein, including embodiments using hierarchical timing analysis performed at any stage of a circuit design, are possible in accordance with the various embodiments presented herein.

To ensure that a circuit design works as planned, a design team uses static timing analysis to determine if the various clocks and signals within a circuit design are correctly implemented. Incorrect implementation of timing may prevent a circuit from functioning. Flat analysis of timing within an integrated circuit uses analysis of every element and wire in the design. As system on a chip (SoC) designs grow in complexity due to mare gates, functionality, operating modes, and expected operating conditions, a flat analysis of timing may involve an unmanageably large amount of memory and analysis time. In a hierarchical approach, blocks of logic are grouped together within a circuit design. These blocks are then modeled as timing abstractions within the design.

In either case, the elements and any corresponding hierarchical blocks of a circuit design will have some on-chip variation due to manufacturing processes that vary from lot-to-lot, waver-to-wafer, and die-to-die. Such variations are based on line edge roughness, random dopant processes, variations in line width, spacing, thickness, variations in interconnects, variations in operating voltages and temperatures, various sorts of layout-dependent effects, and other such aspects of a circuit. This results, for example, in the amount of time for a signal to pass through a circuit element having variation between different devices due to this on-chip variation.

Some timing analysis processes may use the extreme possibilities of on-chip variation for each circuit element in order to verify that the design functions correctly under the planned-for operating conditions. This can result in an "over-design," where the amount of tolerance built into a design to meet timing is far more than actually necessary due to the extreme improbability of all circuit elements having additive impacts on circuit characteristics (e.g., all elements passing signals slower than average or all elements passing signals faster than average). EDA timing analysis that attempts to use too much information about the variations in circuit elements, however, can be very resource intensive. This is particularly an issue when the on-chip variation is not symmetrical (e.g., the shape of the distribution on different sides of the average are different).

Embodiments described herein use information about the on-chip variation of circuit elements (e.g., a probability distribution function (PDF) describing on-chip variation for a relevant characteristic of the circuit element) to generate statistical values associated with the PDF, including a skewness value to describe the asymmetry of the PDF, to generate data structures for use with timing analysis. These data structures, which include the skewness value (e.g., (E[(delay−delay_mean)^3])^(1/3) where the delay is a PDF as detailed below), can be used to perform timing analysis, or can be used to modify other symmetrical estimates of the on-chip variation to perform a simplified timing analysis. The data structures including skewness may thus be used to propagate the skewness values through a circuit design as part of a timing analysis, or can simply be used to inform other types of timing analysis operations. The use of a skewness value to describe the on-chip variation of circuit elements provides improved systems and methods for performing accurate timing analysis while conserving processing resources that would be used for timing analysis with similar accuracy under previously known timing analysis operations.

FIG. 1 is a diagram illustrating one possible design process flow for generating a circuit including embodiments to meet timing constraints according to some embodiments. This includes possible design process flows for timing and signal integrity analysis to generate a circuit design and an associated circuit in accordance with various example embodiments. It will be apparent that other design flow operations may function using the timing constraints and optimizations described herein, but design flow 100 is described here for the purposes of illustration. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where instances of a multi-instance block are used in the circuit design and any additional circuitry for the design around the blocks is selected. The initial strategy, tactics, and context for the device to be created are also generated in the design input operation 101, depending on the particular design algorithm to be used.

In some embodiments, following an initial selection of design values in design input operation 101, timing analysis and optimization according to various embodiments occurs in an optimization operation 111, along with any other automated design processes. As described below, design constraints for blocks of a circuit design generated with design inputs in design input operation 101 may be analyzed using timing analysis according to various embodiments. While design flow 100 shows such optimization occurring prior to layout instance 112, such timing analysis and optimization may be performed at any time to verify operation of a circuit design. For example, in various embodiments, constraints for blocks in a circuit design may be generated prior to routing of connections in a circuit design, after routing, during register transfer level (RTL) operations, or as part of a final signoff optimization or verification prior to a device fabrication operation 122.

After design inputs are used in design input operation 101 to generate a circuit layout, and any optimization operations 111 are performed, a layout is generated in layout instance 112. The layout describes the physical layout dimensions of the device that match the design inputs. This layout may then be used in a fabrication operation 122 to generate a device, or additional testing and design updates may be performed using designer inputs or automated updates based on the design simulation 132 operations or 3D modeling and analysis 144 operations. Once the device is generated, the device can be tested as part of device test 142 operations, and layout modifications generated based on actual device performance.

As described in more detail below, design updates 136 from design simulation 132, design updates 146 from device test 142 or 3D modeling and analysis 144 operations, or direct design input operation 101 may occur after an initial layout instance 112 is generated. In various embodiments, whenever design inputs are used to update or change an aspect of a circuit design, a timing analysis and optimization operation 111 may be performed.

For example, in various embodiments, a user may provide an input to an EDA computing device indicating placement of an instance of a multi-instance block within a first portion of a circuit design. Once a design is ready, another input to the EDA computing device may be used to generate constraints for each instance of the multi-instance block, and a timing analysis may be performed using the constraints. An output to a display of the EDA computing device may show results of the timing analysis, or may show optimizations recommended or automatically performed adjustments to the circuit design based on the timing analysis. Further inputs to the EDA computing device may involve adjustments such as user design inputs, with additional timing analysis and optimization initiated via user operation of the EDA computing device.

Figure 2:
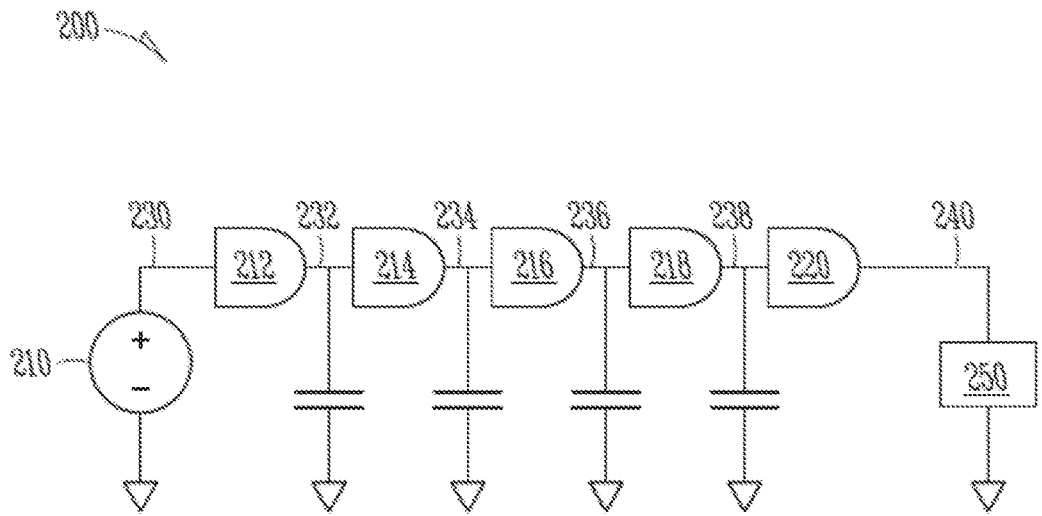
FIG. 2 then illustrates an example circuit diagram representing a circuit that may be analyzed using statistical static timing analysis with skew in accordance with some embodiments.
Figure 3:
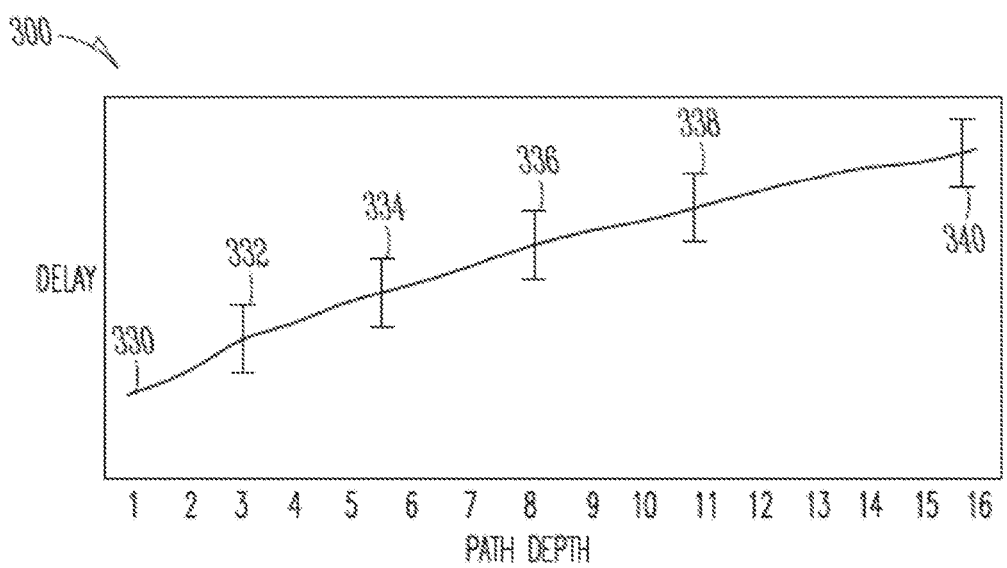
FIG. 3 shows a timing delay graph for a circuit with on-chip variation in accordance with some embodiments.
Figure 4:
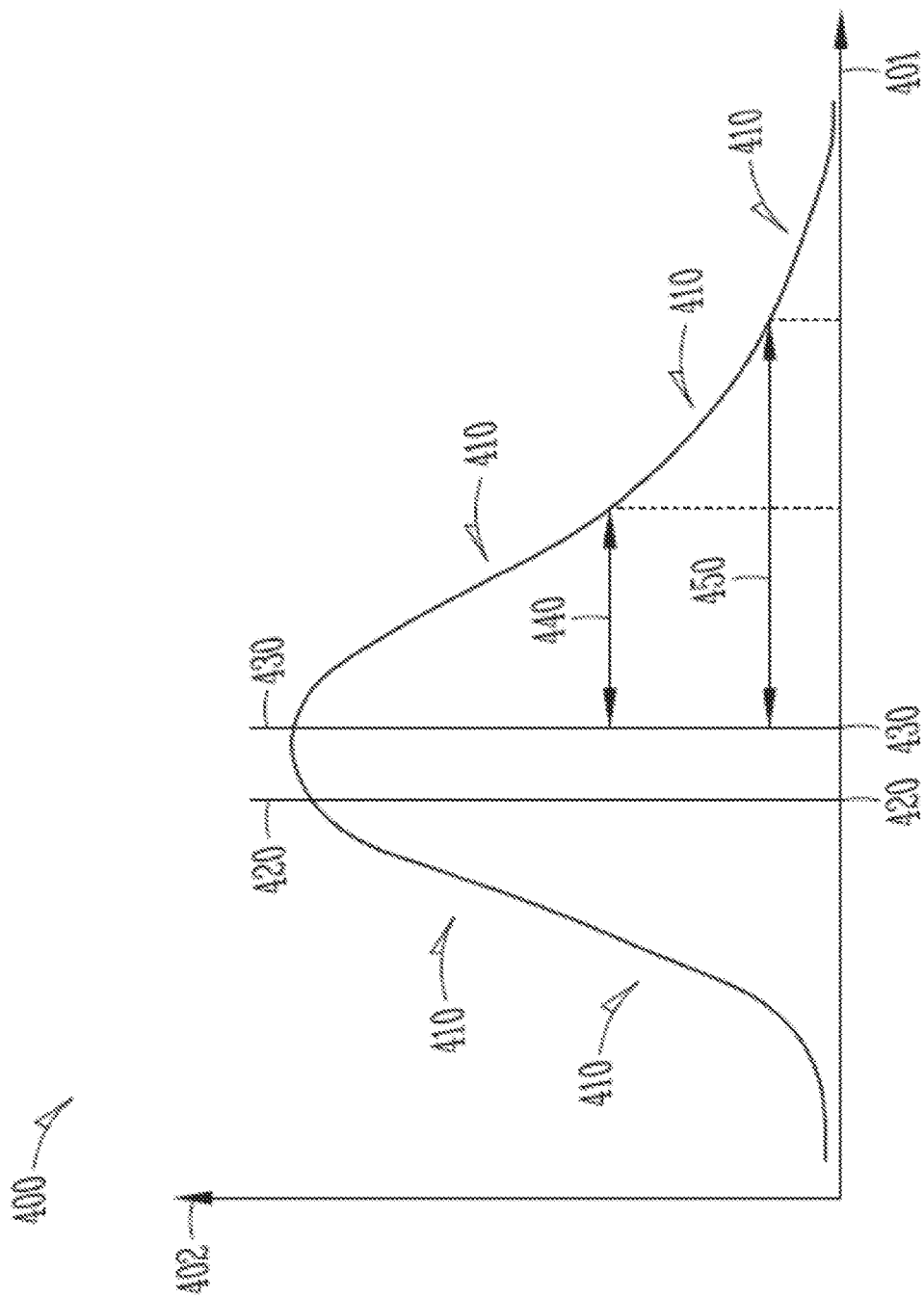
FIG. 4 presents a probability density function (PDF) that describes on-chip variation for a circuit element or block that may be analyzed using statistical static timing analysis with skew in accordance with some embodiments.

FIG. 2 then illustrates an example circuit diagram 200 representing a circuit that may be analyzed using statistical static timing analysis with skew. FIG. 3 shows a timing delay graph 300 for a circuit, such as circuit diagram 200, with on-chip variation. FIG. 4 presents a probability chart 400 representing probability density function (PDF) 410 that represents on-chip variation for a circuit element or block that may be analyzed using statistical static timing analysis with skew.

FIG. 2 then illustrates an example circuit diagram 200 representing a circuit that may be analyzed using statistical static timing analysis with skew in accordance with some embodiments. The circuit diagram 200 includes a signal input element 210, circuit elements 212-220, and load 250. The timing path from signal input element 210 to load 250 includes path points 230-240. As a signal travels from signal input element 210 to load 250, the various transmission paths and circuit elements receive the signal and pass it on with some time delay. The on-chip variation generates some variation in this delay in different physical circuits that implement the circuit of circuit diagram 200.

FIG. 3 shows a timing delay graph 300 for a circuit, such as circuit diagram 200, with on-chip variation in accordance with some embodiments. Timing delay graph 300 shows a line for average delay 310 along a path within a circuit such as the circuit of circuit diagram 200. Due to on-chip variation, the actual delay in an individual circuit will have a range of possibilities, such that path points 230-240 would have corresponding delay ranges 330-340. Due to the individual variation at each circuit element 212-220, the delay range for the path point following a circuit element will be larger than the delay range for the previous path points in the circuit path.

FIG. 4 presents a representative probability density function (PDF) 410 that represents on-chip variation for a circuit element or block that may be analyzed using statistical static timing analysis with skew in accordance with some embodiments. PDF 410 may, for example, represent the possible timing variation for an individual circuit element of circuit diagram 200, such as circuit element 212 or any other such circuit element (e.g., individual chip level transistors, transmission lines, or abstracted circuit blocks or cells). The individual PDFs for each element in a circuit path add to create the delay ranges illustrated in FIG. 3. In order to finalize a design, the statistical static timing analysis performs operations to estimate the delay ranges along each path in a circuit design, and verifies that these estimates are within the allowable ranges to confirm correct operation of the circuit (e.g., performs a timing closure for a circuit design).

A detailed analysis of a circuit timing using details of the PDF describing on-chip variation for elements of a circuit design may be done using a Monte Carlo analysis, but such operations are resource intensive. Other analysis operations that model the PDF for circuit elements as a symmetrical Gaussian include significant errors, as the actual PDF for many circuit elements will be asymmetric. Embodiments described herein model the PDF for elements of a circuit design using a set of statistical values including a skew value to describe the on-chip variation of circuit elements in order to balance the errors caused by simplifying the PDF against the processing costs of using a more complex analysis. Embodiments described herein thus limit the number of parameters used in statistical static timing analysis by modeling on-chip variation using sets of parameters to describe estimates of PDFs for circuit elements. Various embodiments use different distributions, such as skew-normal, log-normal, beta, Cauchy, chi-squared, gamma, t-distribution, or any other such distributions describable using a set of statistical values including a skew value (e.g., a third moment of a distribution). Chart 400 plots values of a circuit element characteristic 401 (e.g., delay under given operating conditions) against an associated probability value 402. Key descriptors of the PDF 410 may be identified and used to create a simplified set of data to represent PDF 410. The embodiment of FIG. 4 shows a nominal characteristic value 420, a mean characteristic value 430, a standard deviation 440, and a skew 450.

Figure 5:
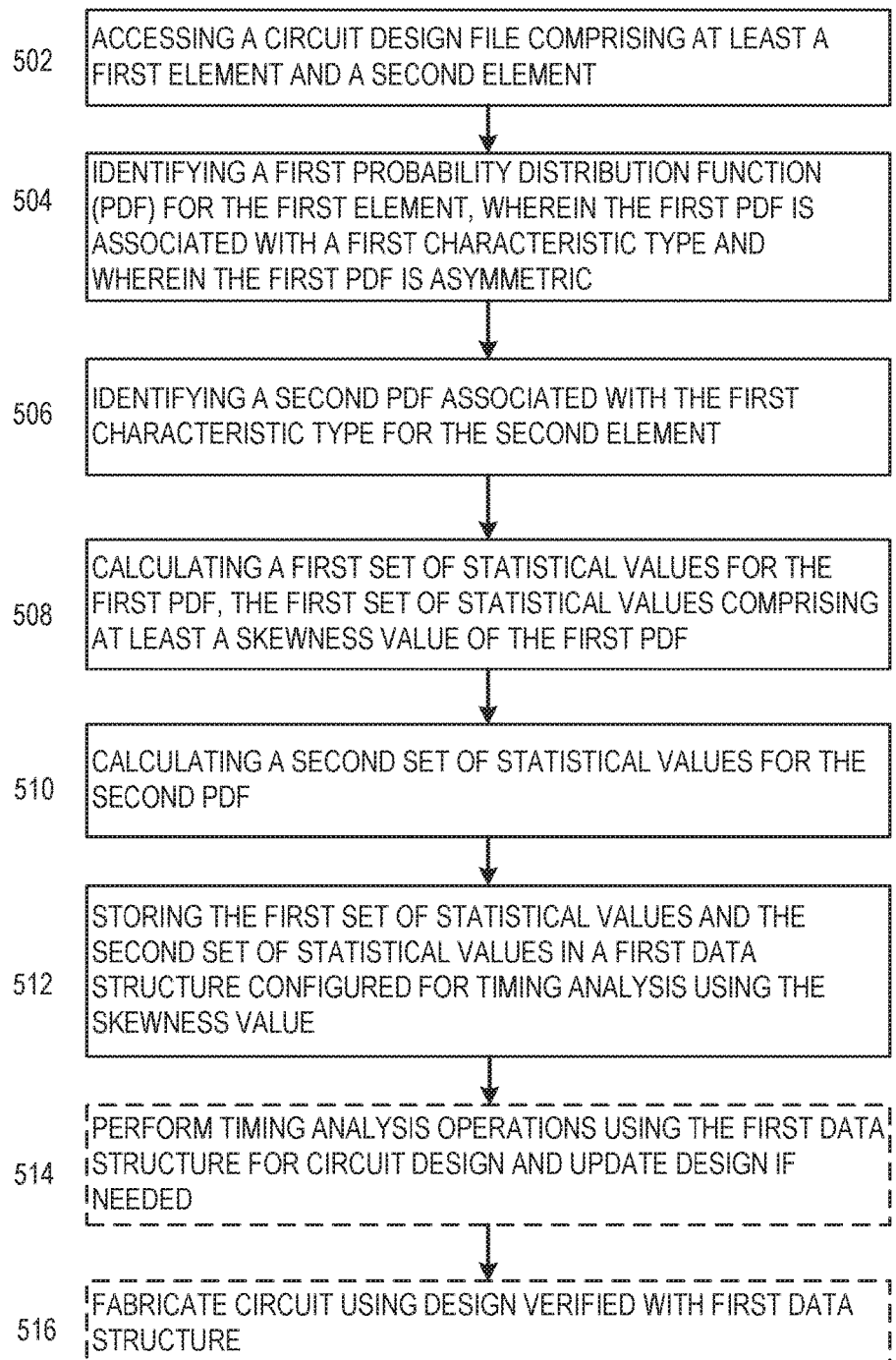
FIG. 5 describes a method for use with statistical static timing analysis in accordance with some embodiments.

FIG. 5 describes a method 500 for use with statistical static timing analysis in accordance with some embodiments. FIG. 5 shows method 500, which may be performed by a device (e.g., an EDA computing device executing EDA instructions), in accordance with some embodiments. In other embodiments, method 500 is represented by instructions that, when executed by one or more processors, cause the device to perform method 500.

The example embodiment of method 500 begins with operation 502 accessing a circuit design file comprising at least a first element and a second element. As described above, such elements may be individual structures, transmission paths, transistors or such within a circuit design. In other embodiments, elements used by method 500 may be blocks or cells that represent groupings of other structures within a circuit design. The circuit design file may comprise a library of elements that includes data describing expected on-chip variation for the elements, or may be data provided by a designer.

A first probability distribution function (PDF) for the first element is then identified in operation 504. In the operations of method 500, the first PDF is associated with a first characteristic type and the first PDF is asymmetric. Operation 506 then involves identifying a second PDF associated with the first characteristic type for the second element. Any number of additional PDFs for circuit elements in an individual timing path or within multiple timing paths for a circuit design may be identified as part of operation 506 or in repetitions of operation 506.

Operations 508 and 510 involve determining statistical values including at least a skewness value for a first PDF. In operation 508, a first set of statistical values for the first PDF is determined, the first set of statistical values comprising at least a skewness value of the first PDF. Operation 510 then similarly calculates or determines a second set of statistical values for the second PDF.

In operation 512, the first set of statistical values and the second set of statistical values are stored in a first data structure configured for timing analysis using the skewness value. In one embodiment, for example, the first data structure is a Liberty Variation File (LVF) file. In one example embodiment, an LVF file or a similar data structure includes a cell rise mean shift determined as $E[PDFdelay]-PDFdelay\_nominal$, a cell rise standard deviation defined as $(E[PDFdelay^2]-PDFdelay\_mean^2)^{(1/2)}$, and a cell rise skewness defined as $(E[(PDFdelay-PDFdelay\_mean)^3])^{(1/3)}$, where PDFdelay is a random variable similar to PDF 410, where $E(PDFdelay)=PDFdelay\_mean$ which is the mean value of PDFdelay similar to mean characteristic value 430, and where PDFdelay_nominal is a nominal delay value for PDFdelay similar to nominal characteristic value 420. In other embodiments, other sets of statistical values may be used.

Following generation and storage of these statistical constructs (e.g., the first data structure), various timing analysis operations are performed using the statistical values in operation 514, and in operation 516, a circuit can be fabricated using the design file as verified and modified as needed to meet timing constraints to verify design operation before device fabrication. In various embodiments, various devices, systems, and methods are used to fabricate devices based on the updated circuit design. In some embodiments, this includes generation of masks, and the use of machinery for circuit fabrication. In various implementations, files generated by embodiments described herein are used to create photolithographic masks for lithography operations used to generate circuits according to a circuit design, where a pattern defined by the masks is used in applying a thin uniform layer of viscous liquid (photo-resist) on the wafer surface. The photo-resist is hardened by baking and then selectively removed by projection of light through a reticle containing mask information. In some implementations, the files are further used for etching patterning, where unwanted material from the surface of the wafer is removed according to details described in the design files, where a pattern of the photo-resist is transferred to the wafer by means of etching agents. In some embodiments, aspects of design files generated according to the operations described herein are used for deposition operations, where films of the various materials are applied on the wafer. This may involve physical vapor deposition (PVD), chemical vapor deposition (CVD) or any such similar processes. Some embodiments may use files generated according to operations described herein for chemical mechanical polishing, where a chemical slurry with etchant agents is used to planarize to the wafer surface; for oxidation where dry oxidation or wet oxidation molecules convert silicon layers on top of the wafer to silicon dioxide; for ion implantation where dopant impurities are introduce into a semiconductor using a patterned electrical field; or for diffusion where bombardment-induced lattice defects are annealed. Thus, in various embodiments, systems and operations include not only computing devices for generating updated circuit design files, but also hardware systems for fabricating mask, controlling IC fabrication hardware, and the hardware and operations for fabricating a circuit from a circuit design generated using hierarchical timing analysis as described herein.

In various embodiments of method 500, the operations may be repeated in different ways or involve intervening operations. Method 500 describes the generation of sets of statistical values which then may be used for timing analysis in various ways. In some embodiments, additional operations for performing timing analysis may occur directly following operations to generate the statistical values. For example, certain operations of method 1200 may follow the operations of method 500 or additional combinations or variations of operations may be performed.

In some embodiments, for example, operations may be performed for part or all of a timing path rather than an individual element of a circuit where the first set of statistical values further comprises a cumulative distribution function of a normalized Gaussian random variable.

One embodiment involves repeating the operations of method 500, performing the same operations for different operating conditions, and then storing the resulting information for different operating conditions of a single element or block in a table. In one such embodiment, such a table or data structure comprises a plurality of sets of statistical values organized by shared associations with load conditions and slew conditions.

The above embodiment of FIG. 4 illustrates a PDF 410 for a circuit element under a particular set of operating conditions. Depending on the characteristic described by a PDF and the different possible operating conditions being analyzed, the PDF for a circuit element may vary. In particular, different input slew conditions (e.g., characteristics of signal input element 210) and different output load conditions (e.g., characteristics of load 250) may influence the statistical values associated with a PDF for a particular circuit element.

Figure 6:
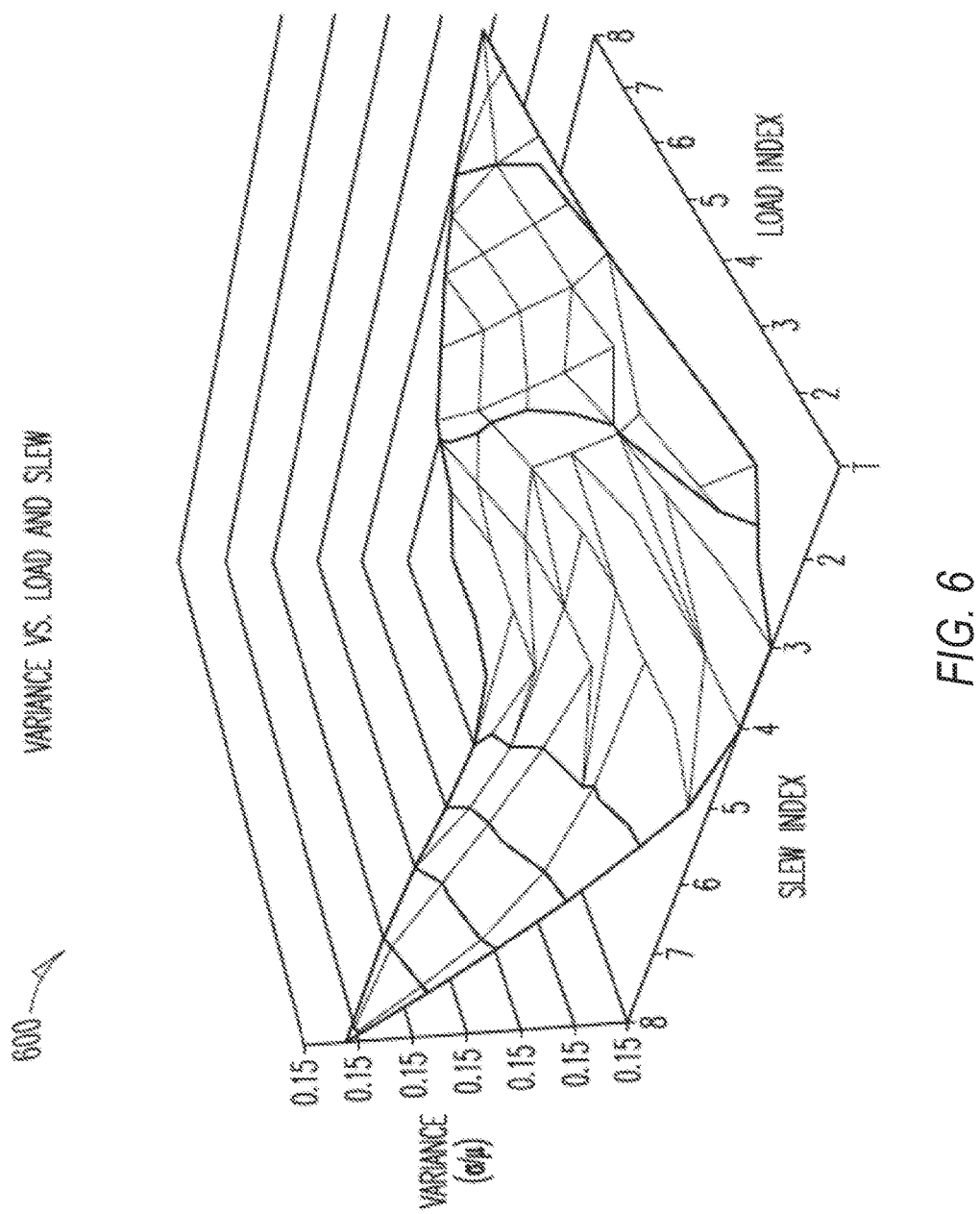
FIG. 6 illustrates aspects of statistical static timing analysis in accordance with some embodiments.

FIG. 6 illustrates aspects of statistical static timing analysis in accordance with some embodiments. FIG. 6 shows chart 600 illustrating a change in variance for an example circuit element under different slew index and load index conditions. The graph of FIG. 6 is merely an illustrative example of differences in aspects of on-chip variation for a particular element. Similar to the changes in variance, the mean and skew and any other statistical value used to characterize a circuit element characteristic may also change under different operating conditions. Also, while FIG. 6 illustrates the impact of on-chip variation under differing conditions for the delay characteristic which is used for timing analysis, other characteristics may be similarly modeled. In order to generate data collections needed for optimized timing analysis, a data structure (e.g., an LVF file) may store sets of statistical values associated with a different PDF for different operating condition points.

FIG. 7, then, illustrates aspects of statistical static timing analysis in accordance with some embodiments. In FIG. 7, a select set of load values 702 and a set of slew values 704 are used to generate a data structure to store sets of statistical values 721-745 for a PDF at each load/slew combination. In one embodiment, each set of statistical values 721-745 comprises a mean shift, cell standard deviation, and skewness value similar to those discussed for operation 512 above. The particular load values 702 and slew values 704 may be selected and adjusted by an operator based on the particular sensitivities of circuit elements. In other embodiments, these values 702, 704 may be selected automatically by a system in response to input operating conditions in order to balance the error caused by considering fewer operating conditions against the processing resources used to analyze additional operating conditions. While FIG. 7 illustrates statistical values for load and slew operating conditions, any number of other operating conditions may also or alternatively be considered, such as temperature. In such embodiments, data structures according to embodiments (e.g., an LVF file) may store tables, database entries, or any such sets of statistical values associated with different PDFs for different operating condition points based on any number of variables considered as part of the circuit timing closure.

Figure 8:
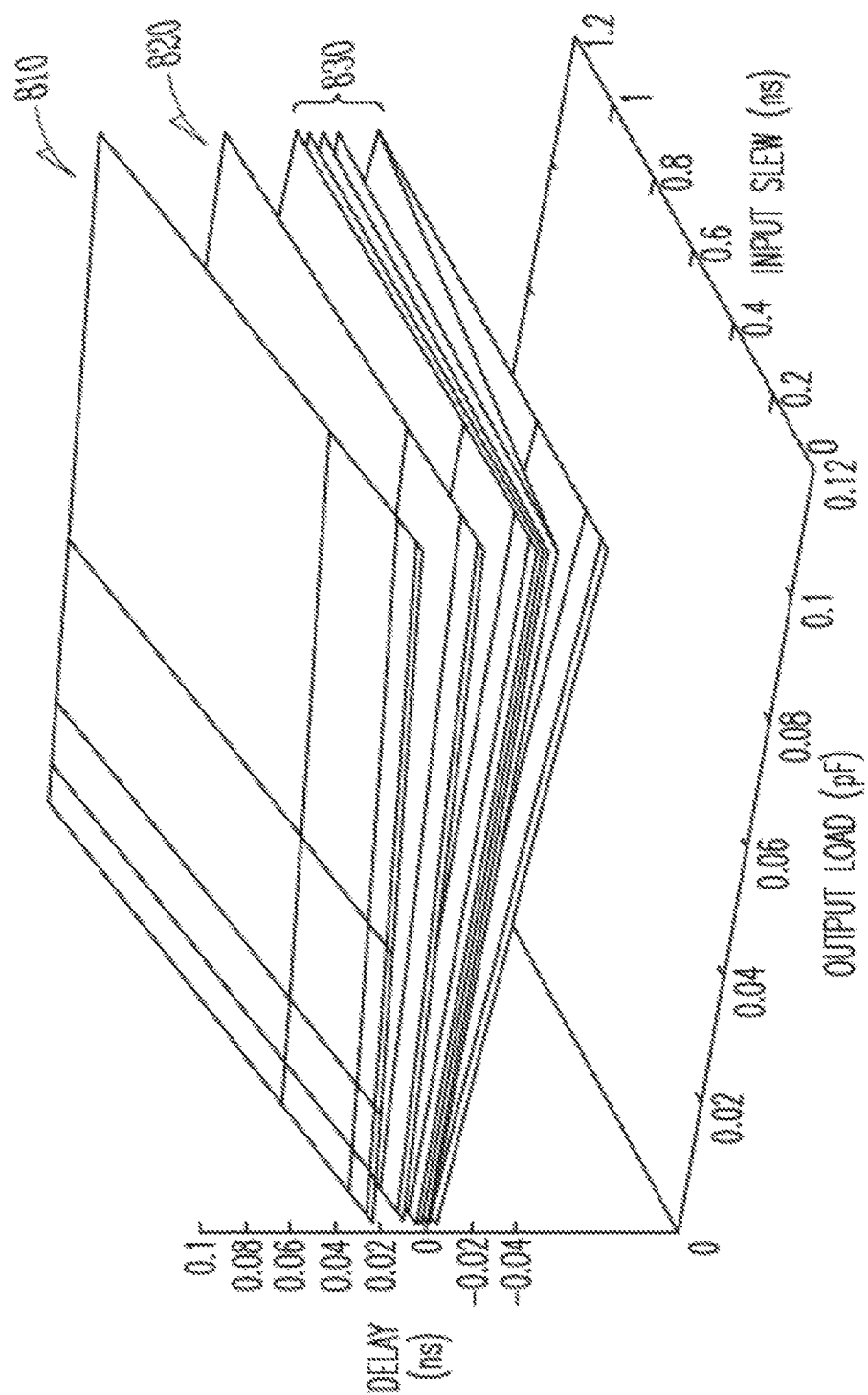
FIG. 8 illustrates aspects of statistical static timing analysis in accordance with some embodiments.

FIG. 8 illustrates aspects of statistical static timing analysis, in accordance with some embodiments, by comparing correlated variations across multiple circuit elements against uncorrelated variations. As mentioned above, due to the random statistical nature of on-chip variation, calculating a worst-case design based on worst-case possibilities for each block or circuit element often results in excessive design pessimism. When variations under set operating conditions for different devices in a single timing path are uncorrelated, the timing variations across the entire timing path add in a complex manner to generate less overall variation in the timing for the entire path than when such variations are correlated. In FIG. 8, a set of delay sensitivity surfaces 830 for a set of circuit elements in a particular timing path are shown. Sensitivity surface 810 illustrates a result for the entire path when the variations between devices are fully correlated (e.g., conditions causing a longer delay in one element will also cause a longer delay in other elements of the timing path). Sensitivity surface 820 describes a result for the entire path when the variations for the individual elements are not correlated. As can be seen, the overall variation for the entire delay path is significantly greater when the variations are correlated. The use of data structures such as those described above in FIG. 7 enable simplified processing of the timing analysis in view of these complex aspects of statistical on-chip variation.

Figure 9:
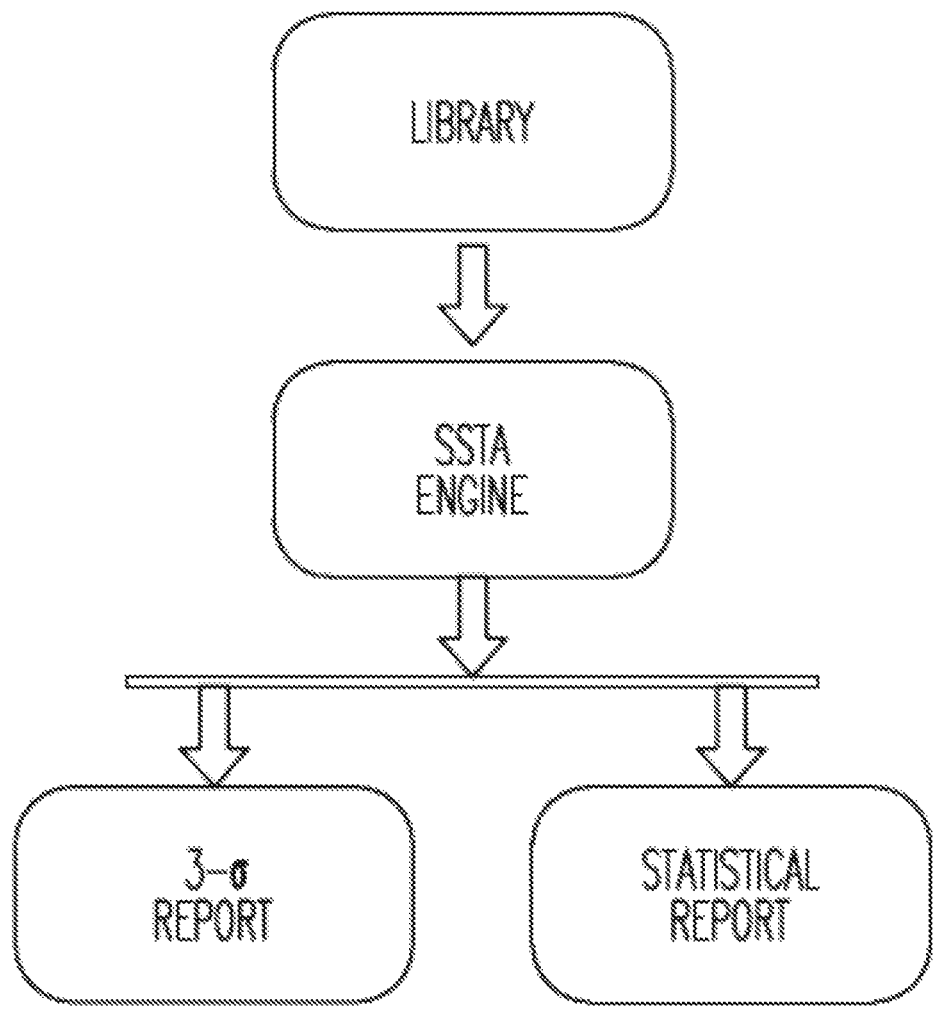
FIG. 9 illustrates aspects of statistical static timing analysis in accordance with some embodiments.

FIG. 9 illustrates aspects of statistical static timing analysis in accordance with some embodiments using such data structures. In FIG. 9, a system includes a library 910. The library 910 includes one or more sets of statistical values for each element in a circuit design. Such values may be generated and stored in the library 910 as described in embodiments above. These values may then be used by a statistical static timing analysis engine 920 to generate output results. One output report is a 3-σ report 930. Another possible output from statistical static timing analysis engine 920 is a statistical report 940.

Figure 10:
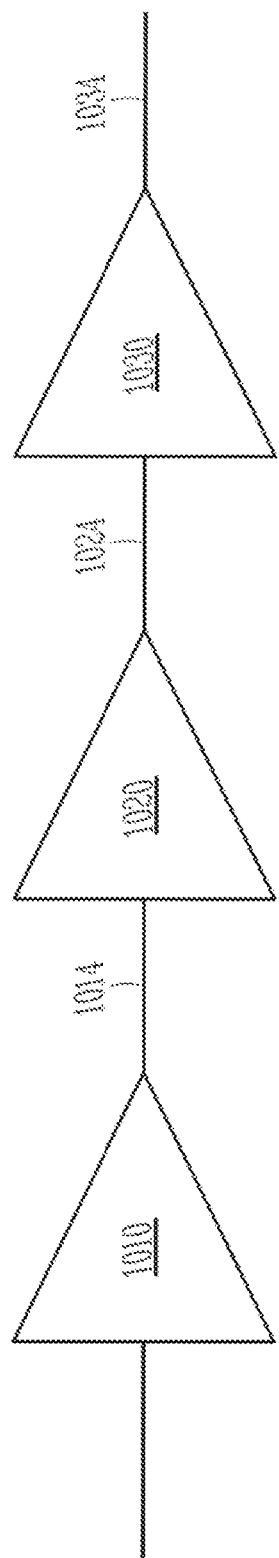
FIG. 10 illustrates aspects of statistical static timing analysis in accordance with some embodiments.

FIG. 10 illustrates aspects of statistical static timing analysis in accordance with some embodiments with arrival time sensitivity with partial correlation between slew and delay. FIG. 10 includes circuit elements 1010, 1020, and 1030. Circuit element 1010 has a first characteristic:

$$\sigma A1, 1 = \sigma A1 = \left(\frac{\partial D_1}{\partial P_1}\right) \quad (1)$$

circuit element 1020 has a partially correlated set of first characteristics:

$$\left(\frac{\partial D_2}{\partial P_2}, \frac{\partial D_2}{\partial S_1} * \frac{\partial S_1}{\partial P_1}\right) \quad (2)$$

and circuit element 1030 has a partially correlated set of first characteristics:

$$\left(\frac{\partial D_3}{\partial P_3}, \frac{\partial D_3}{\partial S_2} * \frac{\partial S_2}{\partial P_2}\right) \quad (3)$$

Based on this, the arrival time 1014 at the output of circuit element 1010 has a set of characteristics:

$$\sigma A1, 1 = \sigma A1 = \left(\frac{\partial D_1}{\partial P_1}\right) \quad (4)$$

the arrival time 1024 at the output of circuit element 1020 as a set of characteristics:

$$\sigma A2, 2 = \left(\frac{\partial D_2}{\partial P_2}\right),$$
$$\sigma A2, 1 = \left(\frac{\partial D_2}{\partial S_1} * \frac{\partial S_1}{\partial P_1} + \sigma A1, 1\right),$$
$$\sigma A2^2 = \sigma A2, 1^2 + \sigma A2, 2^2, \quad (5)$$

and the arrival time 1034 at the output of circuit element 1030 as a set of characteristics:

$$\sigma A3^2 = \sigma A2.2^2 + \left(\frac{\partial D_3}{\partial P_3}\right)^2 + \left(\frac{\partial D_3}{\partial S_2} * \frac{\partial S_2}{\partial P_2} + \sigma A2, 1\right)^2 \quad (6)$$

When statistical values for each circuit element 1010, 1020, and 1030 are obtained from a data structure, the statistical variation for the timing path including circuit elements 1010, 1020, and 1030 can be calculated and compared with design limits to determine if a current design meets the design goals, or if modifications to the design are needed. Other similar analysis such as calculation of slack or spatial derating can be performed for a design and included in output reports such as 3-σ report 930 or statistical report 940.

Figure 11:
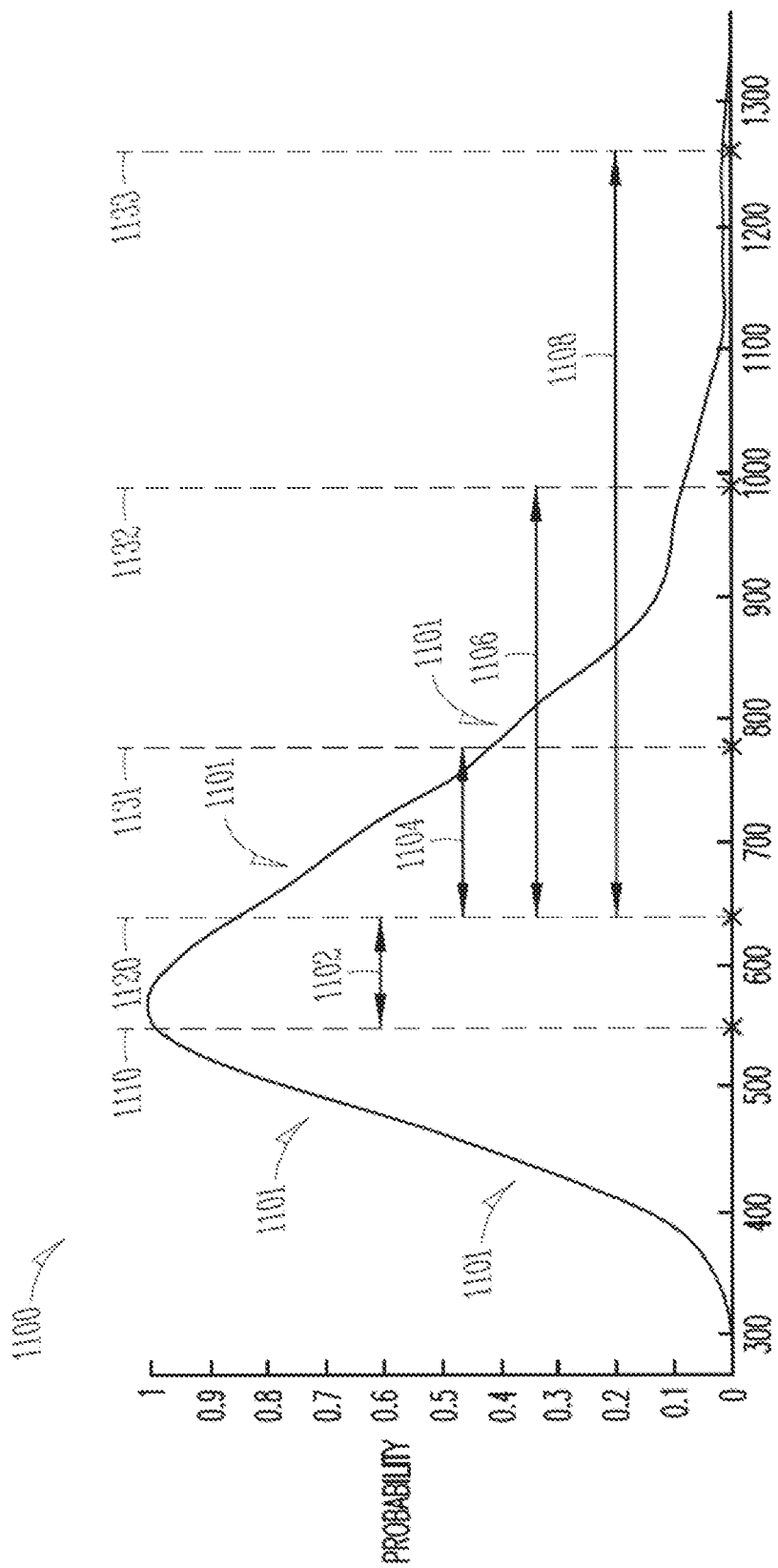
FIG. 11 presents a PDF that describes on-chip variation for a circuit element or block that is analyzed using statistical static timing analysis with skew in accordance with some embodiments.

FIG. 11 presents a PDF that describes on-chip variation for a circuit element or block that may be analyzed using statistical static timing analysis with skew, in accordance with some embodiments. Chart 1100 shows PDF 1101, which is a random variable for a delay characteristic of a circuit element. Chart 1100 illustrates the probability of a certain delay associated with the circuit element under certain operating conditions (e.g., slew, load, temperature, etc.). PDF 1101 is illustrated with a number of calculated statistical values, including nominal value 1110, mean value 1120, mean shift value 1102, first quantile value 1131, second quantile value 1132, and third quantile value 1133.

Certain data structures according to embodiments described herein (e.g., LVF library files) use circuit element characterizations to capture the delay and the slew probability distributions of cell-arcs that are a function of several process variables (e.g., Gaussian variables) in the form of statistical moments of the respective distributions. The extended models that operate according to embodiments described herein may use additional mean shift value 1102, standard deviation, and skewness values of the cell-arc delays and slews. Some embodiments may additionally use a fourth central moment value (e.g., a kurtosis value) in addition to the above moment values.

Assuming delay is a quadratic function of N random variables xn, then $$D(x_1, \ldots, x_N) = D_0 + \sum_{n=1}^{N} a_n x_n + \sum_{\substack{n,k=1 \\ n \neq k}}^{N} b_{n,k} x_n x_k \quad (7)$$

where xn is an independent random variable according to standard normal distribution and D0 is the delay at a nominal point where Xn=0.

The PDF of a normally distributed random variable is:

$$f(x_n) = \frac{1}{\sqrt{2\pi}} e^{-\frac{x^2}{2}} \quad (8)$$

and the fundamental property of a PDF is:

$$\frac{1}{\sqrt{2\pi}} \int_{-\infty}^{\infty} e^{-\frac{x^2}{2}} dx = 1. \quad (9)$$

For a single variable x the delay D is:

$$D(x) = D_0 + ax + bx^2. \quad (10)$$

The mean value is:

$$\mu = E[D(x)] = \int_{-\infty}^{\infty} D(x) f(x) dx. \quad (11a)$$

which can be characterized as:

$$E[D(x)] = D_0 + bE[x^2] = D_0 + b. \quad (11b)$$

The variance (e.g., square of standard variation) is:

$$\sigma^2 = \text{Var}[D(x)] = E[D(x) - \mu]^2 = \int_{-\infty}^{\infty} D(x)^2 f(x) dx - \mu^2. \quad (12a)$$

which can be characterized as:

$$\text{Var}[D(x)] = \quad (12b)$$
$$E[D(x)^2] - \mu^2 = E[a^2 x^2 + 2abx^3 + b^2 x^4] - \mu^2 = a^3 + 2b^2$$

and the skewness is:

$$\gamma = \text{Skewness}[D(x)] \quad (13)$$

-continued $$= E[(D(x) - \mu)^3]$$

$$= E[(ax + bx^2 - b)^3]$$

$$= E[b^3x^6 + 3ab^2x^5 + 3a^2bx^4 - 3b^3x^4 + a^3x^3 - 6ab^2x^3 -$$
$$3a^2bx^2 + 3b^3x^2 + 3ab^2x - b^3]$$

$$= 8b^3 + 6a^2b$$

which can be used for a characterization of a normalized cube-root of skewness which is:

$$\gamma_{normalized} = \frac{\sqrt[3]{E[(D(x) - \mu)^3]}}{\sqrt{\text{Var}[D(x)]}} = \frac{\sqrt[3]{8b^3 + 6a^2b}}{\sqrt{a^2 + 2b^2}}. \quad (14)$$

Given the above, for a random variable with a distribution N (x0, σ), the delay can be approximated by a quadratic function of x using the points x=x0, x-=x0+Δ, and x=x0−Δ. Then:

$$D_{-\Delta} = D_0 - a\Delta + b\Delta^2 \quad (15)$$

and $$D_{+\Delta} = D_0 + a\Delta + b\Delta^2 \quad (16)$$

which results in $$a = (D_{+\Delta} - D_{-\Delta})/2\Delta, \quad (17)$$

and $$b = (D_{+\Delta} + D_{-\Delta} - 2D_0)/2\Delta^2. \quad (18)$$

These expressions for a and b can then be used to compute a shift in mean, signal, and skewness of delay and slew.

Similar characterizations can be extended for multiple variables x. If the variables are not correlated, the mean is:

$$\mu = D_0 + \sum_{n=1}^{N} b_{n,n} \quad (19)$$

the standard deviation is:

$$\sigma = \sqrt{\sum_{n=1}^{N} (a_n^2 + 2b_{n,n}^2) + \sum_{\substack{n,k=1 \\ n \neq k}}^{N} b_{n,k}^2}. \quad (20)$$

and the skewness is:

$$\gamma = \sqrt[3]{\sum_{n=1}^{N} (8b_{n,n}^3 + 6a_n^2 b_{n,n}) + \sum_{\substack{n,k=1 \\ n \neq k}}^{N} 6a_n a_k b_{n,k} + \sum_{\substack{n,k=1 \\ n \neq 1}}^{N} 6(b_{n,n} + b_{k,k})b_{n,k}^2} \quad (21)$$

which is normalized as:

$$\gamma_{normalized} = \frac{\gamma}{\sigma}. \quad (22)$$

The heuristic bounding approach described above takes delay and skewness into account while limiting the variations for standard structures (e.g., standard LVF files compared with extended LVF files using additional statistical values described herein). The above can then be used as EDA computing device calculated statistical values that can be used to perform timing analysis operations.

PDF 1101 of FIG. 11 is a strongly non-Gaussian delay PDF. Given a known probability distribution (e.g., the ability to calculate the mean, standard deviation, and skew from the PDF data), the non-Gaussian distribution can be modeled using other standard distributions such as skew-normal, log-normal, beta, Cauchy, chi-squared, gamma, student t, or other such distribution types.

In the example below, the PDF 1101 modeled on data from a 7-nanometer inverter operating at 0.5V is modeled using a chi-squared distribution as the delay is modeled to be a quadratic function of Gaussian-random process variables (e.g., the square of a Gaussian random variable follows a chi-squared distribution). Also, within some library characterization data structures that may be used with some embodiments, delay and slew are modeled as quadratic functions of process random variables.

PDF 1101 includes a "long tail" at the higher delay end as part of the skewness. This skewness impact on delay can be modeled by making the standard deviation of the circuit element delay equal to the effective sigma of the inverter delay for a given quantile of the delay PDF 1101. The first quantile value 1131 corresponds to the first sigma of the delay distribution if it was a Gaussian distribution instead of a non-Gaussian distribution. Similarly, the second quantile value 1132 corresponds to the second sigma, and the third quantile value 1133 corresponds to the third sigma if the non-Gaussian PDF 1101 were a Gaussian distribution. The first quantile value 1131 corresponds to a probability of approximately 0.84135 and so is referred to as Q(0.84135). The second and third quantile values 1132 and 1133 are similarly referred to as Q(0.97725) and Q(0.99865). The effective sigmas at each of the three quantile values 1131, 1132, and 1133 as well as the kth quintile are defined below as:

$$\text{eff}_{1\sigma} = Q(0.84135) - \mu \quad (23)$$

$$\text{eff}_{2\sigma} = \frac{Q(0.97725) - \mu}{2.0} \quad (24)$$

$$\text{eff}_{3\sigma} = \frac{Q(0.99865) - \mu}{3.0} \quad (25)$$

and $$\text{eff}_{k\sigma} = \frac{Q(k\sigma) - \mu}{k} = \frac{Q(GaussCDF(k)) - \mu}{k} \quad (26)$$

where Q(k σ) is the quantile corresponding to k-sigma of the delay PDF and where k σ=GaussCDF, which is the cumulative distribution function of a normalized Gaussian random variable.

The kth effective sigma can then be modeled using the standard deviation a of a delay PDF as:

$$\text{eff}_{k\sigma} = rFac \cdot \sigma \quad (27)$$

and $$rFac = \frac{Q(GaussCDF(k)) - \mu}{k \cdot \sigma} \quad (28)$$

Thus, for a non-Gaussian delay or slew PDF, the standard deviation can be multiplied by rFac to compute an effective sigma, which when added to the mean value 1120, gives the sigma quantiles for reporting. Thus, effective first sigma 1104, effective second sigma 1106, and effective third sigma 1108 can be determined using the above modeling factor rFac, which can be computed as follows.

Assuming a chi-squared distribution as described above, the delay for a circuit element is modeled for a single random variable as:

$$d = d_0 + ax + bx^2 \quad (29)$$

The first three moments of the delay d are then given by:

$$\mu_d = d_0 + b \quad (30)$$

$$\sigma_d = \sqrt{a^2 + 2b^2} \quad (31)$$

and $$\gamma_d = \sqrt[3]{8b^3 + 6a^2 b} \quad (32)$$

The delay d normalized to the mean and standard deviation is then given by:

$$d_{norm} = \frac{d - d_0}{\sqrt{a^2 + 2b^2}} = \frac{ax + bx^2}{\sqrt{a^2 + 2b^2}} = \frac{x + (b/a)x^2}{\sqrt{1 + 2(b/a^2)}} \quad (33)$$

and the first three moments of the normalized delay are:

$$u_{d_{norm}} = 0 \quad (34)$$

$$\sigma_{d_{norm}} = \frac{\sqrt{a^2 + 2b^2}}{\sqrt{a^2 + 2b^2}} = 1 \quad (35)$$

and $$\gamma_{d_{norm}} = \frac{\sqrt[3]{8b^3 + 6a^2 b}}{\sqrt{a^2 + 2b^2}} = \frac{\sqrt[3]{8(b/a)^3 + 6(b/a)}}{\sqrt{1 + 2(b/a)^2}} \quad (36)$$

From equation 36 above, it can be seen that different values of (b/a) give different skewed (chi-squared) distributions. Given a fixed value of (b/a), the normalized PDF for PDF 1101 can be modeled from a Monte-Carlo sampling of x using statistical operations. Such operations may be performed using a statistical software package (e.g., Matlab™, Python, etc.). For a fixed value of (b/a), from the Monte-Carlo distribution samples, rFac for any given k-sigma quantile Qn(k σ) where n=(b/a):

$$rFac = \frac{Q_\eta(GaussCDF(k)) - \mu}{k \cdot \sigma} \quad (37)$$

By repeating Monte-Carlo simulations for a range of values where n=(b/a) varies from −1 to 1 and k varies from −3 to 3, a two-dimensional table for rFac can be computed as a function of n and k. Since the normalized skewness is uniquely determined by n, the table for rFac is a function of the normalized skewness and k. For a circuit element (e.g., cell-ark) delay sensitivity calculation, with a given input slew and output load, a standard deviation value and a skewness value are retrieved from system data structures (e.g., LVF library tables). Based on the normalized skewness value and a user-specified k-sigma bound, the associated rFac can be identified from an rFac table stored in the system. The standard deviation of the circuit element delay is scaled with the rFac multiplier from the table (or any other such data structure) to obtain an effective standard deviation, which is used in timing arrival computations as part of timing analysis operations. A similar algorithm is repeated for circuit element output slew sensitivity calculations. The slew sensitivity calculations are then propagated downstream to the next stage, and which will impact the delay sensitivity calculations in the next stage. This heuristic bounding approach can then be repeated and propagated for an entire timing path. The output results are then reported or used in additional timing analysis and circuit design modification as needed to meet design constraints.

In any embodiments described above, following closure of timing (e.g., a determination that the current version of a circuit design meets all timing requirements specified by the designer), some embodiments include systems, devices, and operations for fabricating a circuit in addition to the systems and operations for generation of design and analysis files.

Figure 12:
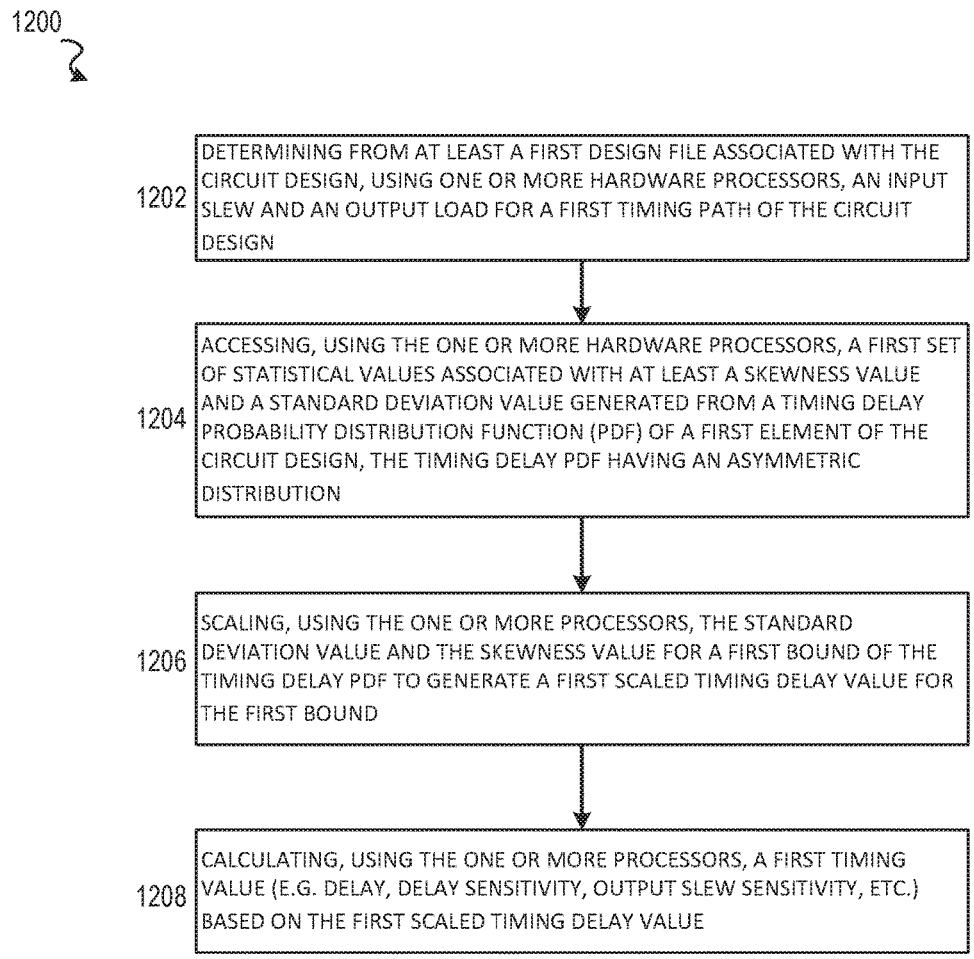
FIG. 12 describes a method for use with statistical static timing analysis in accordance with some embodiments.

FIG. 12 then describes a method 1200 for use with statistical static timing analysis in accordance with some embodiments. FIG. 12 shows method 1200, which may be performed by a device (e.g., an EDA computing device executing EDA instructions, a server computer, a computer workstation, a networked computing system, etc.), in accordance with some embodiments. In other embodiments, method 1200 is represented by instructions that, when executed by one or more processors, cause the device to perform method 1200.

The example embodiment of method 1200 begins with operation 1202 that involves determining from at least a first design file associated with the circuit design an input slew and an output load for a first timing path of the circuit design. Such values may be determined from design constraints, or from analysis of various elements of the circuit design that are surrounding the elements or timing paths being analyzed.

Once these initial values are determined, operation 1204 then involves accessing a first set of statistical values associated with at least a skewness value and a standard deviation value generated from a timing delay probability distribution function (PDF) of a first element of the circuit design, where the timing delay PDF has an asymmetric distribution. In one embodiment, these statistical values are determined from a table such as the table described in FIG. 7. In other embodiments, these values may be calculated from other values, or may simply be based on an analysis of the PDF.

The standard deviation value and the skewness value are then scaled in operation 1206. The scaling is performed for a first bound of the timing delay PDF to generate a first scaled timing delay value for the first bound. The bound may be selected automatically based on other criteria being used for timing analysis, or based on an operator selection of the bound. In some embodiments, the analysis may be repeated for different bounds.

In operation 1208, a first timing value is calculated based on the first scaled timing delay value. In various embodiments, the calculated timing value may be one or more expected delay values, delay sensitivity values, output slew sensitivity values, or other such values. In one embodiment, the output value may be a propagated PDF for multiple elements in a timing path that provides delay range information describing, for example, delay range 340.

The above embodiment provides benefits in allowing statistical timing analysis using simplified calculations based on skewness measurements for circuit elements with asymmetric operating characteristics.

In various embodiments, operations similar to those described above for method 1200 may then be repeated in various ways for different types of analysis. In one embodiment, a method may further involve accessing corresponding statistical values for a plurality of elements of the first timing path. A corresponding delay sensitivity value is calculated for each element of the first timing path, a path delay sensitivity for the first timing path using the corresponding delay sensitivity for each element of the first timing path is determined.

Another embodiment involves determining, from a second input slew and a second output load associated with a second operating condition for the first timing path of the circuit design. A second set of statistical values is accessed, and scaled to generate second scaled timing delay value for the first element, and then a second timing value for the first element based on the second scaled timing delay value.

These various timing values may then be compared with design constraints to determine compliance with device design expectations. In some embodiments, this may be done for a set of multi-mode multi-corner (MMMC) views associated with the circuit design. When such views are determined, a set of input slew and output load operating pairs associated with the set of MMMC views can be identified. Then, for each input slew and output load operating pair of the set of input slew and output load operating pairs, a corresponding set of statistical values, each corresponding set of statistical values associated with at least a corresponding skewness value and a corresponding standard deviation value generated from a corresponding PDF, can be accessed. Corresponding first timing values for each set of input slew and output load operating pairs associated with the set of MMMC views can then be calculated.

Additionally, as described above, in addition to the skewness values, in various embodiments a normalized kurtosis value (e.g. for the fourth central moment of a PDF) may further be used in the operations described. In some embodiments, use of the kurtosis value reduces uncertainty and error in the estimates at a cost of some increased use of processing resources.

Figure 13:
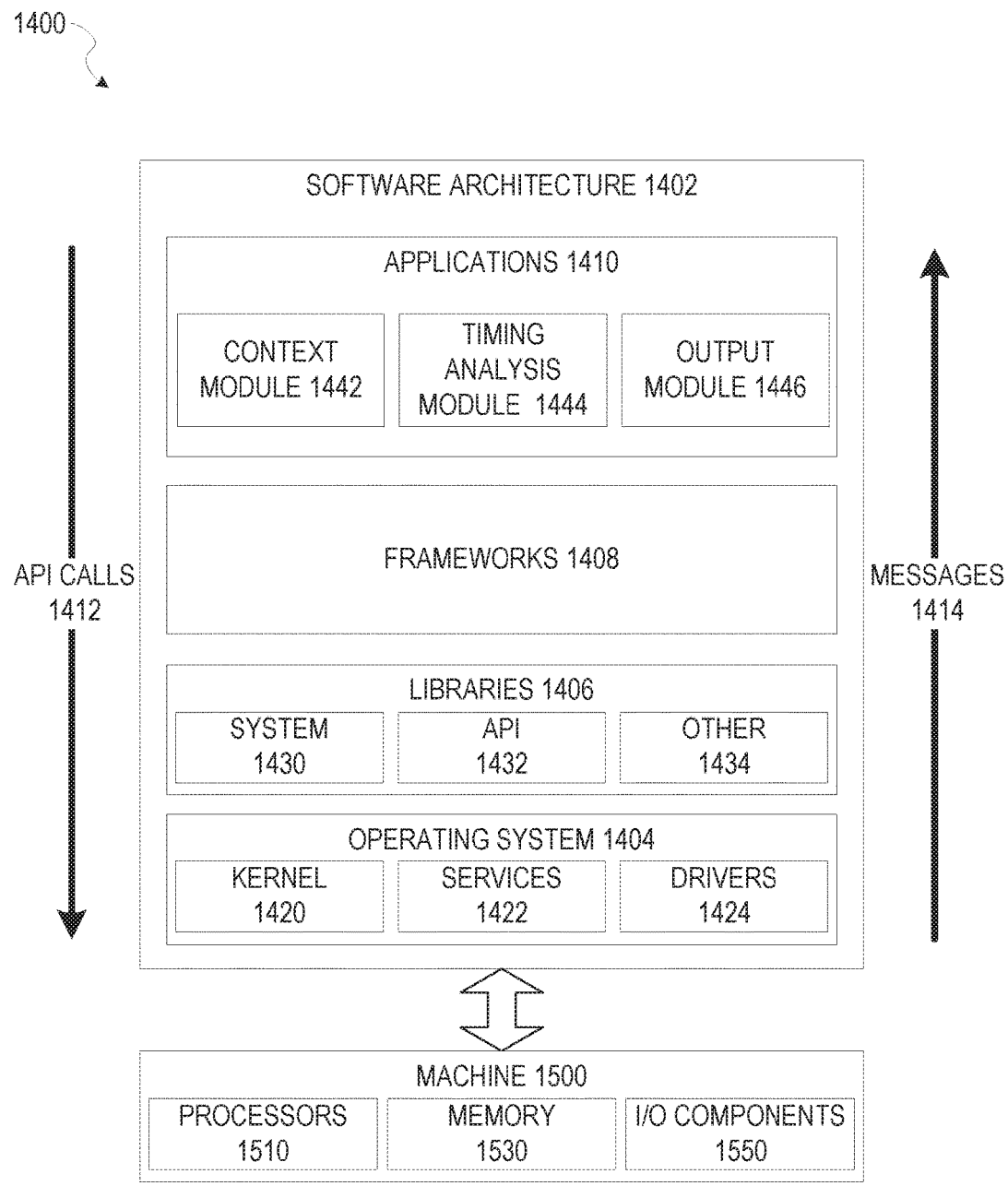
FIG. 13 is a block diagram illustrating an example of a software architecture that may be operating on an electronic design automation (EDA) computer and used with methods for meeting concurrent timing constraints for multi-instantiated block optimization, according to some example embodiments.

FIG. 13 is a block diagram 1400 illustrating an example of a software architecture 1402 that may be operating on an electronic design automation (EDA) computer and used with methods for meeting concurrent timing constraints for multi-instantiated block optimization, according to some example embodiments. FIG. 13 shows is a block diagram illustrating a software architecture 1402, which can be used as an electronic design automation computing device to implement any of the methods described above. Aspects of software architecture 1402 may, in various embodiments, be used to store circuit designs and execute timing analysis or optimization in an EDA environment to generate circuit designs, with physical devices generated using these circuit designs.

FIG. 13 is merely a non-limiting example of a software architecture 1402, and it will be appreciated that many other architectures can be implemented to facilitate the functionality described herein. In various embodiments, the software architecture 1402 is implemented by hardware such as machine 1500 of FIG. 14 that includes processors 1510, memory 1530, and I/O components 1550. In this example, the software architecture 1402 can be conceptualized as a stack of layers where each layer may provide a particular functionality. For example, the software architecture 1402 includes layers such as an operating system 1404, libraries 1406, frameworks 1408, and applications 1410. Operationally, the applications 1410 invoke application programming interface (API) calls 1412 through the software stack and receive messages 1414 in response to the API calls 1412, consistent with some embodiments. In various embodiments, any client device, server computer of a server system, or any other device described herein may operate using elements of software architecture 1402. An EDA computing device described herein may additionally be implemented using aspects of the software architecture 1402, with the architecture 1402 adapted for operating to perform multi-instance timing analysis in any manner described herein.

In one embodiment, an EDA application of applications 1410 performs multi-instance timing optimization according to embodiments described herein using various modules within software architecture 1402. For example, in one embodiment, an electric design automation (EDA) computing device similar to machine 1500 includes memory 1530 and one or more processors 1510. The processors 1510 implement context module 1442 to generate timing contexts from input data for an integrated circuit design. The processors 1510 also implement timing analysis module 1444 to process design input files to generate phase and timing data for instances and multi-mode multi-corner (MMMC) views using context data from context module 1442, and to perform timing analysis with output timing reports.

Processor-implemented output module 1446 may then be used to update a display of I/O components 1550 of the EDA computing device with data associated with the set of timing analysis results.

In various other embodiments, rather than being implemented as modules of one or more applications 1410, some or all of modules 1442, 1444, and 1446 may be implemented using elements of libraries 1406 or operating system 1404.

In various implementations, the operating system 1404 manages hardware resources and provides common services. The operating system 1404 includes, for example, a kernel 1420, services 1422, and drivers 1424. The kernel 1420 acts as an abstraction layer between the hardware and the other software layers, consistent with some embodiments. For example, the kernel 1420 provides memory management, processor management (e.g., scheduling), component management, networking, and security settings, among other functionality. The services 1422 can provide other common services for the other software layers. The drivers 1424 are responsible for controlling or interfacing with the underlying hardware, according to some embodiments. For instance, the drivers 1424 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1406 provide a low-level common infrastructure utilized by the applications 1410. The libraries 1406 can include system libraries 1430 such as libraries of multi-instance blocks for use in an EDA environment or other libraries that can provide functions such as memory allocation functions, string manipulation functions, mathematic functions, and the like. In addition, the libraries 1406 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1406 may also include other libraries 1434.

The software frameworks 1408 provide a high-level common infrastructure that can be utilized by the applications 1410, according to some embodiments. For example, the software frameworks 1408 provide various graphic user interface (GUI) functions, high-level resource management, high-level location services, and so forth. The software frameworks 1408 can provide a broad spectrum of other APIs that can be utilized by the applications 1410, some of which may be specific to a particular operating system 1404 or platform. In various embodiments, the systems, methods, devices, and instructions described herein may use various files, macros, libraries, and other elements of an EDA design environment to implement analysis described herein. This includes analysis of input design files for an integrated circuit design, along with any element of hierarchical analysis that may be used as part of or along with the embodiments described herein. While netlist files, library files, SDC files and viewdefinition files are examples that may operate within a software architecture 1402, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1500 including processors 1510), with these operations being accessible via a network (e.g., the Internet) and via one or more appropriate interfaces (e.g., an application program interface (API)). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 1500, but deployed across a number of machines 1500. In some example embodiments, the processors 1510 or processor-implemented modules are located in a single geographic location (e.g., within a home environment, an office environment, or a server farm). In other example embodiments, the processors or processor-implemented modules are distributed across a number of geographic locations.

Figure 14:
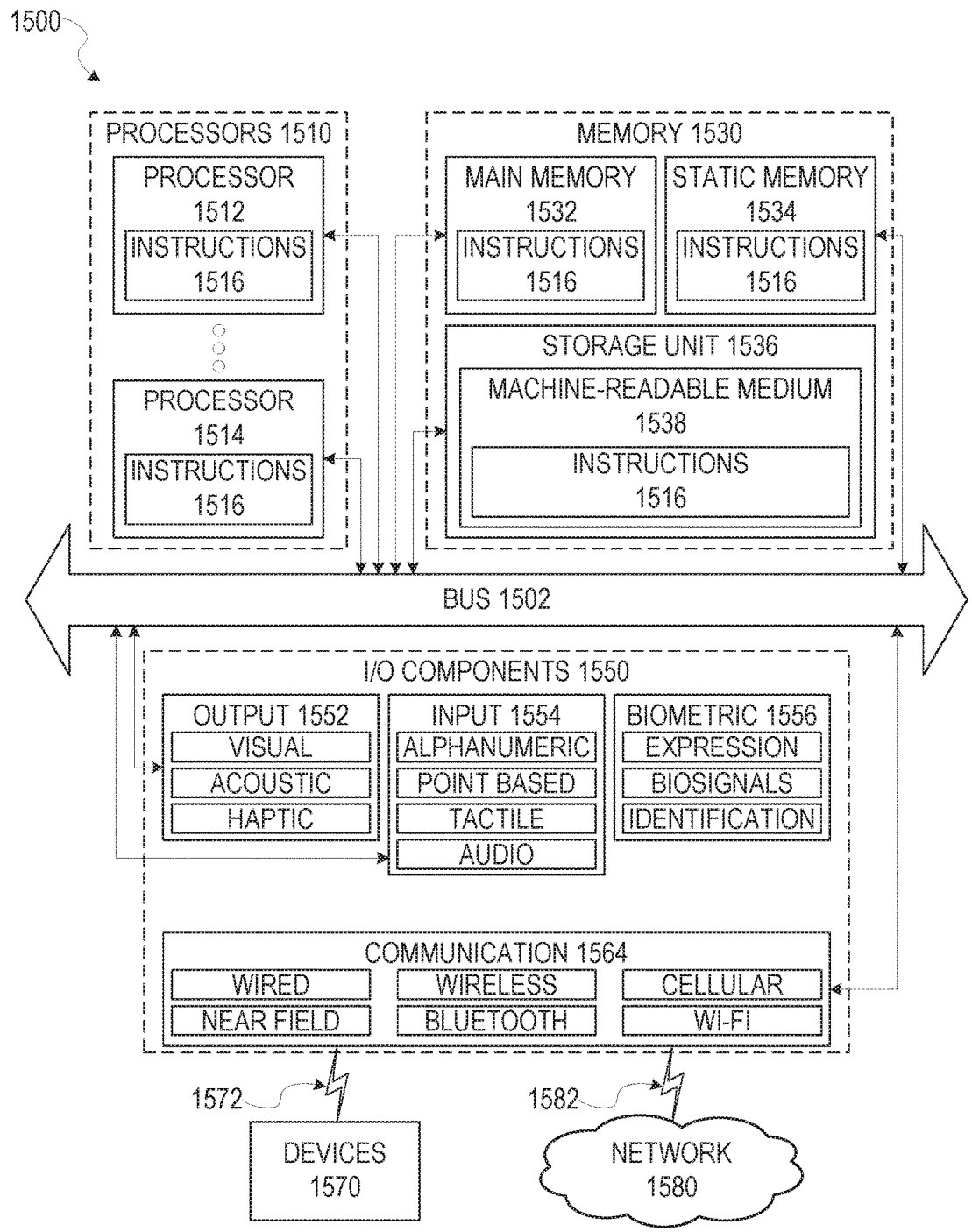
FIG. 14 is a diagrammatic representation of a machine in the form of a computer system within which a set of instructions are executed, causing the machine to perform any one or more of the methodologies discussed herein, according to some example embodiments.

FIG. 14 is a diagrammatic representation of the machine 1500 in the form of a computer system within which a set of instructions may be executed for causing the machine 1500 to perform any one or more of the methodologies discussed herein, according to an example embodiment. FIG. 14 shows components of the machine 1500, which is, according to some embodiments, able to read instructions from a machine-readable medium (e.g., a machine-readable storage medium) and perform any one or more of the methodologies discussed herein. Specifically, FIG. 14 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein can be executed. In alternative embodiments, the machine 1500 operates as a standalone device or can be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

In various embodiments, the machine 1500 comprises processors 1510, memory 1530, and I/O components 1550, which can be configured to communicate with each other via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1512 and a processor 1514 that may execute the instructions 1516. The term "processor" is intended to include multi-core processors 1510 that may comprise two or more independent processors 1512, 1514 (also referred to as "cores") that can execute instructions 1516 contemporaneously. Although FIG. 14 shows multiple processors 1510, the machine 1500 may include a single processor 1512 with a single core, a single processor 1512 with multiple cores (e.g., a multi-core processor 1512), multiple processors 1510 with a single core, multiple processors 1510 with multiples cores, or any combination thereof.

The memory 1530 comprises a main memory 1532, a static memory 1534, and a storage unit 1536 accessible to the processors 1510 via the bus 1502, according to some embodiments. The storage unit 1536 can include a machine-readable medium 1538 on which are stored the instructions 1516 embodying any one or more of the methodologies or functions described herein. The instructions 1516 can also reside, completely or at least partially, within the main memory 1532, within the static memory 1534, within at least one of the processors 1510 (e.g., within the processor's cache memory), or any suitable combination thereof, during execution thereof by the machine 1500. Accordingly, in various embodiments, the main memory 1532, the static memory 1534, and the processors 1510 are considered machine-readable media 1538.

As used herein, the term "memory" refers to a machine-readable medium 1538 able to store data temporarily or permanently and may be taken to include, but not be limited to, random-access memory (RAM), read-only memory (ROM), buffer memory, flash memory, and cache memory. While the machine-readable medium 1538 is shown, in an example embodiment, to be a single medium, the term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions 1516, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1550 include a wide variety of components to receive input, provide output, produce output, transmit information, exchange information, capture measurements, and so on. In general, it will be appreciated that the I/O components 1550 can include many other components that are not shown in FIG. 14. The I/O components 1550 are grouped according to functionality merely for simplifying the following discussion, and the grouping is in no way limiting. In various example embodiments, the I/O components 1550 include output components 1552 and input components 1554. The output components 1552 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1554 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements", "design elements", and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 include a network interface component or another suitable device to interface with the network 1580. In further examples, communication components 1564 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1570 may be another machine or any of a wide variety of peripheral devices (e.g., a peripheral device coupled via a Universal Serial Bus (USB)).

Transmission Medium

In various example embodiments, one or more portions of the network 1580 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, others defined by various standard-setting organizations, other long range protocols, or other data transfer technology.

Furthermore, the machine-readable medium 1538 is non-transitory (in other words, not having any transitory signals) in that it does not embody a propagating signal. However, labeling the machine-readable medium 1538 "non-transitory" should not be construed to mean that the medium 1538 is incapable of movement; the medium 1538 should be considered as being transportable from one physical location to another. Additionally, since the machine-readable medium 1538 is tangible, the medium 1538 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computerized method for timing analysis of a circuit design, the method comprising:
   accessing, using one or more hardware processors, a circuit design file stored in memory, the circuit design file comprising at least a first element and a second element;
   identifying, using the one or more hardware processors, a first probability distribution function (PDF) for the first element, wherein the first PDF is associated with a characteristic type and a first operating condition, the first operating condition comprising at least a load condition and a slew condition and wherein the first PDF is asymmetric;
   identifying, using the one or more hardware processors, a second PDF associated with the characteristic type for the second element;
   calculating, using the one or more hardware processors, a first set of statistical values for the first PDF, the first set of statistical values comprising at least a skewness value of the first PDF;
   calculating, using one or more hardware processors, a second set of statistical values for the second PDF;
   storing, in the memory, the first set of statistical values and the second set of statistical values in a data structure configured for timing analysis using the skewness value;
   identifying a third PDF for the first element, wherein the third PDF is associated with the characteristic type and wherein the third PDF is associated with a second operating condition different from the first operating condition;
   calculating a second set of statistical values for the third PDF, the second set of statistical values comprising at least a third skewness value of the third PDF; and
   wherein the timing analysis and the circuit design are provided for fabricating semiconductor devices.

2. The method of claim 1 wherein the characteristic type is associated with timing delay for the circuit design file.

3. The method of claim 1 wherein the first set of statistical values comprises a normalized skewness value.

4. The method of claim 3 wherein the normalized skewness value is a normalized cube-root of skewness calculated as:

$$\gamma_{normalized} = \frac{\sqrt[3]{E[(D(x) - \mu)^3]}}{\sqrt{\text{Var}[D(x)]}}$$

wherein is $D(x)$ is a PDF for a variable x;
wherein $E(\ )$ is a mean value function;
wherein $\text{Var}[\ ]$ is a variance function; and
$\mu$ is a mean-shift value.

5. The method of claim 4 wherein the first set of statistical values further comprises the mean-shift value determined by modeling the first PDF as a Gaussian function and determining the mean-shift value as a calculated difference between a nominal mean of the Gaussian function and a mean of the first PDF.

6. The method of claim 1 wherein the first set of statistical values further comprises a normalized kurtosis value for the fourth central moment of the first PDF.

7. The method of claim 1 wherein the first set of statistical values further comprises a cumulative distribution function of a normalized Gaussian random variable.

8. The method of claim 1 further comprising:
   identifying, using the one or more hardware processors, a fourth PDF for the first element, wherein the fourth PDF is associated with the characteristic type, wherein the fourth PDF is asymmetric, and wherein the fourth PDF is associated with a second operating condition different than the first operating condition;
   calculating, using the one or more hardware processors, a fourth set of statistical values associated with the fourth PDF, the fourth set of statistical values comprising at least a skewness value of the fourth PDF;
   storing, in the memory, the fourth set of statistical values in the data structure.

9. The method of claim 8 wherein the data structure comprises a table including a plurality of sets of statistical values organized by shared associations with load conditions and slew conditions.

10. The method of claim 1 further comprising:
    determining, from at least a first design file associated with the circuit design, an input slow and an output load for a first timing path of the circuit design comprising the first circuit element,
    accessing at least the first design file using the input slew and an output slew to identify the first set of statistical values;
    scaling the skewness value for at least a first bound of the first PDF to generate a first scaled timing delay value for the first bound; and
    calculating at least a first timing value for the first design file based on the first scaled timing delay value.

11. The method of claim 10 wherein the first timing value comprises a delay sensitivity value.

12. The method of claim 11 further comprising:
    determining an associated set of statistical values for each element of the first timing path;
    generating scaled timing delay values for each element of the first timing path;
    calculating timing values for each element of the first timing path; and
    determining a timing path delay sensitivity for the first timing path using the timing values for each element of the first timing path.

13. A device for generating timing analysis values, the device comprising:
    a memory configured to store the timing analysis values comprising a first set of statistical values and a second set of statistical values in a data structure configured for timing analysis using a skewness value; and
    one or more processors coupled to the memory and configured for timing analysis value generation operations to:

access a circuit design file stored in memory, the circuit design file comprising at least a first element and a second element, identify a first probability distribution function (PDF) for the first element, wherein the first PDF is associated with a timing delay characteristic type and wherein the first PDF is asymmetric, and a second PDF associated with the timing delay characteristic type for the second element, calculate the first set of statistical values for the first PDF, the first set of statistical values comprising at least a skewness value of the first PDF;

calculate the second set of statistical values for the second PDF;

wherein the first set of statistical values comprises a normalized skewness value calculated as:

$$\gamma_{normalized} = \frac{\sqrt[3]{E[(D(x)-\mu)^3]}}{\sqrt{\text{Var}[D(x)]}}$$

wherein is D(x) is a PDF for a variable x;
wherein E( ) is a mean value function;
wherein Var[ ] is a variance function; and
wherein μ is a mean-shift value; and
wherein the timing analysis values and the circuit design file are provided for fabricating semiconductor devices.

14. The device of claim 13 wherein the first set of statistical values further comprises the mean-shift value determined by modeling the first PDF as a Gaussian function and determining the mean-shift value as a calculated difference between a nominal mean of the Gaussian function and a mean of the first PDF.

15. A non-transitory computer readable medium comprising instructions that, when executed by one or more processors of the device, cause the device to perform operations for generating timing analysis values comprising:
accessing a circuit design file stored in memory, the circuit design file comprising a plurality of elements;
identifying a first probability distribution function (PDF) for a first element of the plurality of elements, wherein the first PDF is associated with a characteristic type and wherein the first PDF is asymmetric;
calculating, using the one or more hardware processors, a first set of statistical values for the first PDF, the first set of statistical values comprising at least a skewness value of the first PDF; and
initiating storage of the first set of statistical values in a memory coupled to the one or more processors, the first set of statistical values being configured for storage in a data structure of the memory and configured for timing analysis using the skewness value;
wherein the first set of statistical values comprises a normalized skewness value calculated as:

$$\gamma_{normalized} = \frac{\sqrt[3]{E[(D(x)-\mu)^3]}}{\sqrt{\text{Var}[D(x)]}}$$

wherein is D(x) is a PDF for a variable x;
wherein E( ) is a mean value function;
wherein Var[ ] is a variance function;
wherein μ is a mean-shift value;

wherein the first set of statistical values further comprises the mean-shift value determined by modeling the first PDF as a Gaussian function and determining the mean-shift value as a calculated difference between a nominal mean of the Gaussian function and a mean of the first PDF; and wherein the timing analysis values and the circuit design file are provided for fabricating semiconductor devices.

16. The non-transitory computer readable medium of claim 15 wherein the instructions further cause the device to perform operations comprising:
determining a set of operating conditions for the first element; and
generating a corresponding set of statistical values for each operating condition of the set of operating conditions, the corresponding set of statistical values for each operating condition comprising the first set of statistical values for the first element as associated with a first operating condition of the set of operating conditions.

17. The non-transitory computer readable medium of claim 15 wherein the set of operating conditions is based on a plurality of possible load condition and a plurality of possible slew conditions.

18. The non-transitory computer readable medium of claim 15 wherein the instructions further cause the device to perform operations comprising:
identifying a third PDF for the first element, wherein the third PDF is associated with the characteristic type and wherein the third PDF is associated with a second operating condition different from the first operating condition wherein the timing analysis and the circuit design are provided for fabricating semiconductor device and wherein the first PDF is associated with a first operating condition, the first operating condition comprising at least a load condition and a slew condition;
calculating a second set of statistical values for the third PDF, the second set of statistical values comprising at least a third skewness value of the third PDF;
identifying, using the one or more hardware processors, a fourth PDF for the first element, wherein the fourth PDF is associated with the characteristic type, wherein the fourth PDF is asymmetric, and wherein the fourth PDF is associated with a second operating condition different than the first operating condition;
calculating, using the one or more hardware processors, a fourth set of statistical values associated with the fourth PDF, the fourth set of statistical values comprising at least a skewness value of the fourth PDF;
storing, in the memory, the fourth set of statistical values in the data structure.

19. The non-transitory computer readable medium of claim 18 wherein the data structure comprises a table including a plurality of sets of statistical values organized by shared associations with load conditions and slew conditions.

20. The non-transitory computer readable medium of claim 15 wherein the instructions further cause the device to perform operations comprising:
determining, from at least a first design file associated with the circuit design, an input slew and an output load for a first timing path of the circuit design comprising the first circuit element;
accessing at least the first design file using the input slew and an output slew to identify the first set of statistical values;

scaling the skewness value for a first bound of the first PDF to generate a first scaled timing delay value for the first bound; and calculating a first timing value for the first design file based on the first scaled timing delay value.

\* \* \* \* \*